INVENTORS
Frank B. Halford
BY Benjamin W. Barlow
ATTORNEY

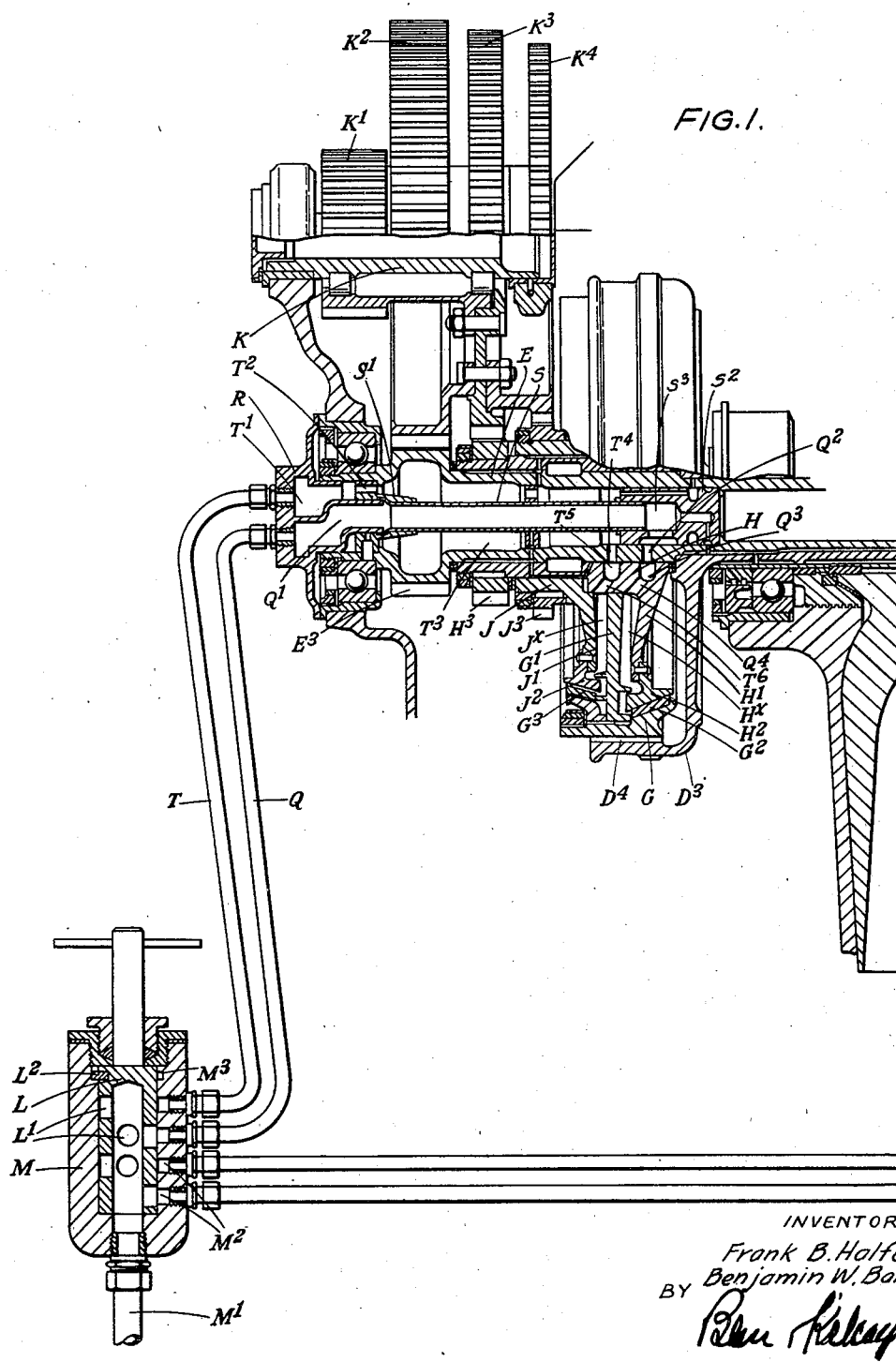

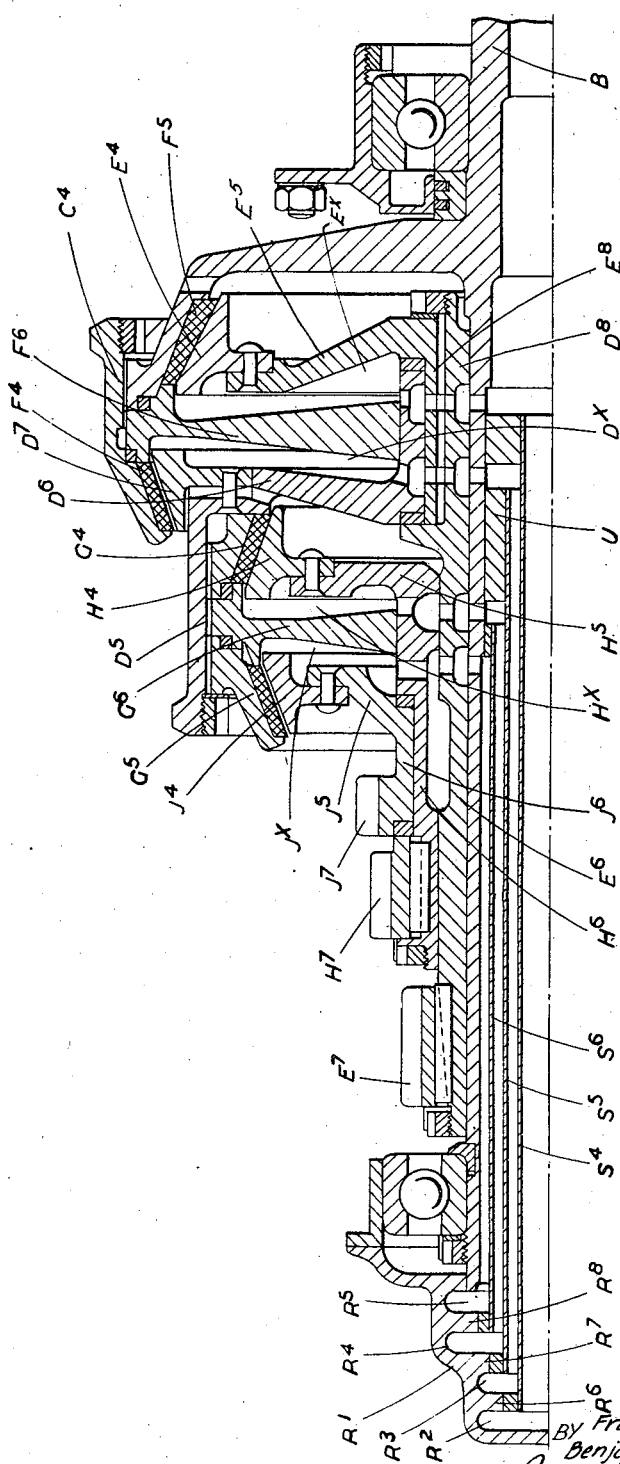

Patented May 19, 1942

UNITED STATES PATENT OFFICE 2,283,435

VARIABLE RATIO TRANSMISSION MECHANISM

Frank Bernard Halford, Edgware, and Benjamin William Barlow, London, England, assignors to D. Napier & Son Limited, London, England, a company of Great Britain Application December 15, 1941, Serial No. 423,123 In Great Britain November 6, 1940

7 Claims. (Cl. 230—114)

This invention relates to variable ratio transmission mechanism in which liquid under pressure is utilized to engage alternatively certain clutch members by means of which the impeller of a supercharger for an internal combustion engine can be driven at different speeds.

According to this invention there is provided in combination three gear wheels all differing in size and fixed on a shaft through which the drive is transmitted, a corresponding number of pinions of different size with which these gear wheels are respectively in mesh, three concentric shaft members on which these pinions are severally mounted, at least one impeller of a supercharger mounted coaxially with the concentric shafts, clutch coupling members respectively associated with the several concentric shafts and the impeller whereby the latter can be driven at different speeds, and hydraulic means for effecting the engagement and disengagement of the several clutch couplings. The mechanism comprises a driving shaft on which are three gear wheels of different sizes, one or more impellers on a shaft, a set of two oppositely directed cone clutch members connected together and to the impeller, a second and similar set of two oppositely directed cone clutch members connected together and mounted on a hollow shaft member which carries also a cone clutch member adapted to engage one of the two clutch members in the impeller set, a second shaft which runs through that first hollow shaft and carries at one end thereof a clutch member adapted to engage the second of the two clutch members in the impeller set and at the other end a pinion which meshes with one of the gear wheels on the driving shaft, a third shaft rotatable on the said second shaft and carrying at one end thereof a clutch member adapted to engage one of the two clutch members in the second set and on the other end a pinion which meshes with one of the gear wheels on the driving shaft, a fourth shaft rotatable on the said third shaft and carrying at one end thereof a clutch member adapted to engage the other of the two clutch members in the second set, and hydraulically actuated means for effecting the engagement and disengagement of the several interengaging clutch members and thereby coupling the impeller to the first hollow shaft or to the second hollow shaft, and also coupling the third or the fourth hollow shaft to the first hollow shaft. The connected clutch members in each set and the separate clutch members adapted to engage respectively with those connected clutch members are mounted so that they can be moved relatively in the axial direction, and by hydraulically actuated means the relative movement between these parts is selectively effected.

The liquid under pressure by means of which the operation of the clutch couplings is controlled passes conveniently to these several coupling members through the annular spaces between the concentric shafts and through the innermost of those shafts which is formed hollow. The flow to the several clutch couplings is conveniently controlled by a rotatable multi-way cock. For example such a cock may comprise a hollow cylindrical member into which passes the liquid under pressure, passages or ports being formed in the wall of this cylinder which as it is rotated can be caused to register successively with ports leading to a series of passages leading respectively to those channels through which the liquid can flow to act on the several clutch couplings.

The liquid employed for the operation of the clutch couplings may be supplied from some convenient source, for example the pressure supply of lubricant to the engine. A separate source of supply may, however, be provided if preferred and separate means for creating and maintaining the necessary pressure which may be derived for example from centrifugal force acting on the liquid in the clutch containing casings.

While the constructional details may be modified as found desirable, the accompanying drawings illustrate by way of example two alternative ways in which the invention may be carried out in practice. In these drawings—

Figure 2 is a similar view showing an alternative way of effecting the engagement and disengagement of the several clutch members.

Figure 1A:
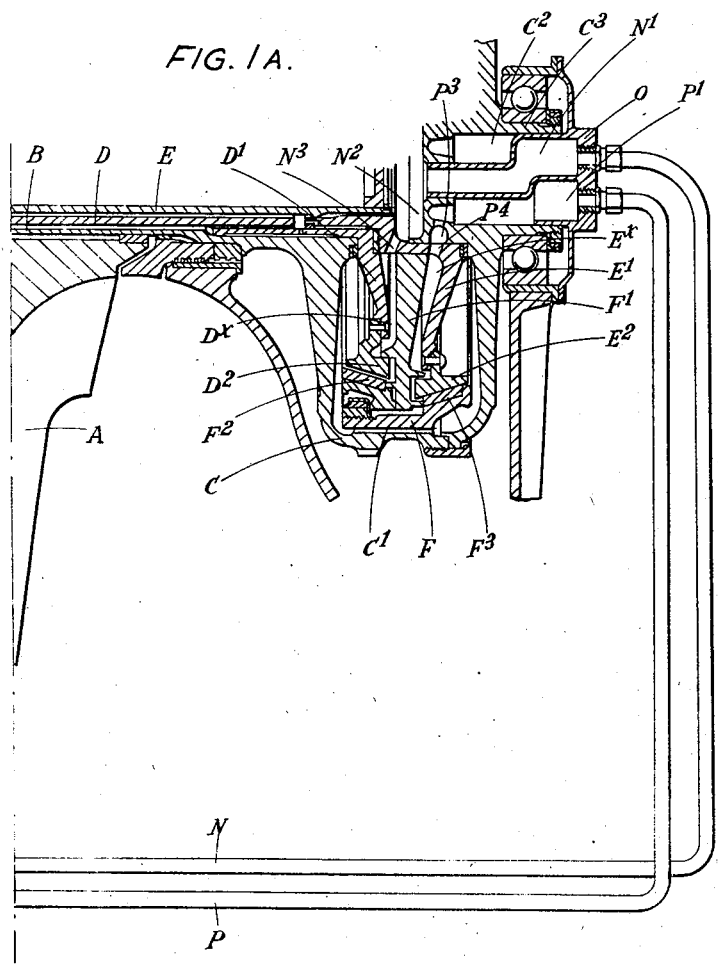
Figure 1 is a longtitudinal part-sectional elevation in which the improved transmission mechanism is shown in a somewhat diagrammatic manner.

In the construction now to be described the supercharger is provided with a single impeller, but it will be understood that the supercharger may be of the multi-stage type with two or more impellers driven simultaneously and at the same speed.

The impeller A is mounted on a hollow shaft B on one end of which and at the one side of the impeller is, a casing C. Running right through the shaft B and lying one within the other are two separate shafts D and E. Inside the casing C is an annulus F connected at $C^1$ to the casing so that both will rotate together, but the annulus can slide relatively to the casing in the direction of their common axis. A partition $F^1$ extends radially inwards from the annulus and can slide and rotate therewith. Mounted in the annulus and on each side of the partition $F^1$ are two cone clutch members $F^2$ and $F^3$, the inclination of the cone surfaces of these members being in opposite directions. A disc $D^1$ which lies within the casing C and at one side of the partition $F^1$ is connected to one end of the hollow shaft D and carries a cone clutch member $D^2$ adapted to engage the clutch member $F^2$. Similarly on the other side of the partition $F^1$ is a disc $E^1$ which is connected to the shaft E and carries a cone clutch member $E^2$ adapted to engage the clutch member $F^3$. On the other end of the shaft D is a casing $D^3$ within which is an annulus G connected to that casing at $D^4$ in such a manner that while the annulus must rotate with the casing it can also slide in and relatively to the casing in the direction of the axis of the latter. Extending radially inwards from the annulus G to which it is connected is a partition $G^1$ which must slide and rotate with the annulus. On either side of the partition two cone clutch members $G^2$ $G^3$ are mounted on the annulus. A sleeve or short hollow shaft H which can rotate on a part of the shaft E carries a disc $H^1$ on which is a cone clutch member $H^2$ adapted to engage the clutch member $G^2$ on the annulus G. Another short shaft or sleeve J which can rotate on the sleeve H carries a disc $J^1$ on which is mounted a cone clutch member $J^2$ which can engage with the clutch member $G^3$ on the annulus. On the outer end of the sleeve H is a pinion $H^3$ and on the outer end of the sleeve J is a pinion $J^3$. On the adjacent end of the hollow shaft E is a pinion $E^3$.

Suitably mounted near and parallel to the above described concentric shafting is a lay shaft K on which, in addition to the gear wheel $K^1$ through which this shaft is driven, are three gear wheels $K^2$ $K^3$ and $K^4$. The gear wheel $K^2$ meshes with the pinion $E^3$, the gear wheel $K^3$ meshes with the pinion $H^3$ and the gear wheel $K^4$ meshes with the pinion $J^3$. The gear wheels $K^2$, $K^3$ and $K^4$ all differ in size and the sizes of the pinions $E^3$, $H^3$ and $J^3$ correspond so that the drive from the lay shaft K can be transmitted in three different gear ratios through the concentric shafting and the several pairs of clutch elements to the impeller A.

Sliding movement in one direction or the other is imparted to the annulus F and similarly to the annulus G by hydraulic pressure the flow of the pressure liquid being controlled so as to effect the several gear changes by the multi-way cock L which is rotatable in a casing M to which and into the hollow body of the cock the pressure liquid is supplied by a pipe $M^1$. The cock L has in it ports $L^1$ which are grouped in relation to the corresponding ports $M^2$ in the casing so that by rotation of the cock into its several successive positions the pressure liquid will be permitted to flow in such a manner as to bring into operation the different gear ratios.

The pressure liquid, preferably oil, flows from the casing M through the piping shown to the space $D^x$ between the partition $F^1$ and the clutch disc $D^1$, to the space $E^x$ between the partition $F^1$ and the clutch disc $E^1$, to the space $H^x$ between the partition $G^1$ and the clutch disc $H^1$, and to the space $J^x$ between the partition $G^1$ and the clutch disc $J^1$. When admitted to any one of these spaces the pressure liquid will cause either the annulus F or the annulus G to slide in the axial direction and bring into engagement one or the other of the pairs of clutch elements. From the cock casing M the pressure liquid flows to the space $D^x$ by way of the pipe N into the part $N^1$ of a fixed hollow plug O which fits into the end of a hollow $C^2$ in the hub $C^3$ of the casing C. The part $N^1$ leads as a centrally situated passage through an opening in the centre of the hub $C^3$ into a closed space $N^2$ at the inner end of the hub whence one or more radial passages $N^3$ lead through the end part of the shaft E into the space $D^x$. The pressure liquid flows from the casing M to the space $E^x$ by way of the pipe P into the part $P^1$ of the interior of the hollow plug O and into the space $C^2$ within the hub $C^3$ around the passage $N^1$. Thence an annular groove $P^3$ in a part of the hub $C^3$ and one or more passages $P^4$ lead into the space $E^x$ through the end part of the shaft E near the clutch disc $E^1$ on that shaft.

Referring to the clutch members towards the other end of the concentric shafting, the pressure liquid flows from the controlling cock L by way of the pipe Q into a passage $Q^1$ within a hollow plug R which is fixed but projects into the end of the hollow shaft E. The end of this passage $Q^1$ engages the end of a tube S which extends within the shaft E between a socket $S^1$ fixed in the end portion of the shaft near the plug R and a hollow plug $S^2$ which is fixed in a suitable position along the shaft E. From the tube S and the interior $S^3$ of the plug $S^2$ the pressure liquid flows through one or more radial passages $Q^2$ through the wall of the shaft E into an annular groove $Q^3$ formed in the short shaft H and thence by a radial passage $Q^4$ into the space $H^x$. From the casing M enclosing the cock L the pressure liquid flows to the space $J^x$ by way of the pipe T into the interior $T^1$ of the fixed plug R and thence by one or more longitudinal passages $T^2$ through the socket $S^1$ into the space $T^3$ within the end portion of the shaft E and around the tube S. From this space $T^3$ the pressure liquid can flow by way of one or more radial passages $T^4$ through the wall of the hollow shaft E into an annular groove $T^5$ in the short shaft H which carries the clutch disc $H^1$. From this annular groove $T^5$ the pressure fluid will pass through one or more radial passages $T^6$ into the space J.

The changes in the transmission ratios for the driving of the impeller A are effected in the following way. The lowest ratio or first gear will be brought into operation by bringing into engagement the pair of clutch elements $F^2$ and $D^2$, which connect the impeller to the hollow shaft D and thus to the casing $D^3$. There are simultaneously brought into engagement the pair of clutch elements $G^3$, $J^2$ by which the casing $D^3$ is connected to the hollow shaft member J and the pinion $J^3$ thereon. As already described this pinion meshes with and is driven by the gear wheel $K^4$ on the driving shaft K. These pairs of clutch elements will be brought respectively into engagement by rotating the cock L into a position in which pressure fluid can flow from the pipe $M^1$ and the casing M through the pipe N into the space $D^x$ wherein the pressure will cause the partition $F^1$ and the annulus F to slide to the right, as seen in the drawings, thus bringing the clutch members $F^2$ and $D^2$ together. With respect to the space $J^x$ the pressure liquid will simultaneously be permitted to flow through the pipe T into this space and thereby cause the partition $G^1$ together with the annulus G to slide to the right, as seen in the drawings, and in so doing bring into engagement the clutch members $G^3$, $J^2$.

It will be seen from the positions in which the ports $L^1$ in the cock L are shown in relation to the ports $M^2$ in the casing M rotation of the cock L through 180° from the position in which it is shown in the drawings will permit the flow of pressure liquid through the pipes N and T respectively with the results described.

The intermediate ratio or second gear is brought into operation by permitting pressure liquid to flow simultaneously to the spaces $D^x$ and $H^x$ thereby bringing into engagement the pair of clutch elements $F^2$, $D^2$, which as already described connect the impeller A through the shaft D to the casing $D^3$, and also the pair of clutch elements $G^2$, $H^2$. The latter couple to the casing $D^3$ the short shaft H with the pinion $H^3$ thereon which meshes with the gear wheel $K^3$ on the driving shaft K. The pressure liquid flows through the pipe N to the space $D^x$ with the effect previously described and at the same time the pressure liquid flows through the pipe Q and passageways indicated above into the space $H^x$ where the pressure causes the partition $G^1$ and the annulus G to slide to the left as seen in the drawings thus bringing the clutch elements $G^2$ and $H^2$ into engagement. This flow of the pressure liquid will occur when the cock L has been turned through 90° from the position shown in the drawing so as to bring two of the ports in the cock into register with the ports $M^2$ in the casing which lead respectively into the pipes N and Q.

The highest ratio or third gear will be brought into operation by allowing the pressure liquid to flow from the casing M through the pipe P into the space $E^x$ whereby the clutch elements $F^3$, $E^2$ are brought into engagement and couple the impeller casing A and casing C to the one end of the hollow shaft E on the other end of which is the pinion $E^3$ which meshes with the wheel $K^2$ which is the largest of those wheels on the driving shaft K. This will be effected by the pressure of liquid in the space $E^x$ causing the partition $F^1$ and the annulus F to slide to the left as seen from the drawing thus bringing into engagement the clutch elements $F^3$ and $E^2$. It will be seen that pressure liquid from the casing M will thus be permitted to pass through the pipe P when the cock L is in the position in which it is shown in the drawing but it will be noted that at the same time flow of the pressure liquid will be permitted to occur through the pipe Q into the space $H^x$ thus again bringing into engagement the clutch elements $H^2$ and $G^2$. The engagement of this pair of clutch elements however will be ineffective so far as the transmission of the drive is concerned because there will be no driving connection between the casing $D^3$ and the impeller casing C owing to the clutch elements $D^2$ and $F^2$ being maintained out of engagement. Through the gear wheel $K^3$ and pinion $H^3$ the hollow shaft D will be rotated, but of course at a slower speed than the shaft E within the shaft D.

The angle through which the cock L can be turned is limited by a pin $L^2$ which projects radially from the cock and engages a groove $M^3$ in the casing M. This groove runs round within the casing through 180° so that the cock cannot be turned beyond its two extreme positions and thus it is not possible to make a change direct from the high to the low gear ratio without passing through the intermediate gear.

When a gear change is made the pressure in the space at one side of a partition $F^1$ or $G^1$ is relieved as the pressure liquid is admitted to the other side of the partition. This relief is effected by leakage through small passages or drain holes provided for the purpose, but not shown in the drawings, these passages permitting the escape of the liquid when the flow to the spaces on one side or the other of each partition is shut off.

In the modified form of the transmission mechanism shown by way of example in Figure 2 the essential difference from that shown in Figure 1 and described above is in the manner in which the engaging clutch members are arranged to be moved relatively. In the construction shown in Figure 1 the impeller clutch set $F^2$ $F^3$ is moved in the axial direction to effect engagement with the separate clutch members $D^2$ $E^2$, and the second set of connected clutch members $G^2$ $G^3$ is moved similarly with respect to the separate clutch members $H^2$ $J^2$. On the other hand in the modified construction the impeller set of two clutch members is fixed in its casing and it is the separate clutch members with the shafts on which they are carried which are moved in the axial direction to engage this double clutch coupling set. Similarly the other two separate clutch members and the shafts on which they are carried are movable in the axial direction in relation to the second set or double clutch coupling.

Referring to Figure 2 the casing $C^4$ on the impeller shaft B is arranged adjacent to the second casing $D^5$ and thus at one and the same side of the impeller. In the impeller casing $C^4$ are fixed the two clutch members $F^4$ and $F^5$ and also the partition $F^6$ so that they can only rotate with the casing. The second casing $D^5$ is directly connected to the disc $D^6$ which carries the clutch member $D^7$ and this disc is mounted on a short shaft member $D^8$, which may be termed the first hollow shaft and can slide within and relatively to the partition $F^6$ so as to effect the engagement or disengagement of the clutch member $D^7$ and the impeller clutch member $F^4$. Within the casing $D^5$ are fixed the two clutch members $G^4$ and $G^5$ and also the partition $G^6$ so that these members can only move in the axial direction when it is desired to engage or disengage the clutch member $D^7$ and the impeller clutch member $F^4$. The clutch member $E^4$ adapted to engage the impeller clutch member $F^5$ is carried on a disc $E^5$ which is mounted on a sleeve splined on one end of a hollow shaft $E^6$, which may be called the second hollow shaft, on the other end of which is the pinion $E^7$ meshing with one of the gear wheels on the driving shaft, not shown in the drawings, but arranged as shown in Figure 1. The short first shaft $D^8$ which carries the casing $D^5$ and clutch disc $D^6$ rotates on the sleeve $E^8$ which carries the clutch disc $E^5$ and it will be seen that these parts and the end portion of the shaft $E^6$ are so arranged that the first and second shafts $D^8$ and $E^6$ with the sleeve $E^8$ and the various parts carried by or connected to these shafts will move altogether in the axial direction on and in relation to the impeller shaft B and its casing $C^4$. Anti-friction washers are interposed between the abutting parts.

Within the casing $D^5$ and adapted to engage with the clutch member $G^4$ is the clutch member $H^4$ carried by the disc $H^5$ on one end of a third shaft $H^6$ on the other end of which is the pinion $H^7$ meshing with one of the gear wheels on the driving shaft. The shaft $H^6$ rotates and can slide in the axial direction on the shaft $E^6$ and the clutch disc $H^5$ is thus movable in relation to the casing $D^5$ and the clutch member $G^4$ carried thereby. The clutch member $J^4$ adapted to engage the clutch member $G^5$ is carried by the disc $J^5$ on a fourth shaft $J^6$ on which is also the pinion $J^7$ meshing with one of the gear wheels on the driving shaft. The shaft $J^6$ rotates on the shaft $H^6$, but cannot move relatively to that shaft in the axial direction, so that these two shafts will thus move together to effect the engagement and disengagement of clutch members G⁴ H⁴ and G⁵ J⁴. Here also anti-friction washers are disposed between the abutting parts.

As in the construction shown in Figure 1 the relative movement of the several pairs of clutch members for the purpose of effecting their engagement or disengagement is caused by admitting liquid to one or the other of the spaces Dˣ Eˣ Hˣ and Jˣ where the requisite pressure is derived from centrifugal force or by supplying the liquid under pressure. Also as in the other construction the flow of this liquid is controlled by a multiway cock from which the liquid passes by pipes, not shown in Figure 2, to a fixed end cap R¹ within which are formed four annular grooves R² R³ R⁴ R⁵ separated by ribs R⁶ R⁷ and R⁸. With anti-friction washers interposed these ribs respectively support the outer ends of three concentric tubes S⁴ S⁵ S⁶ whose inner ends are carried by a plug U fixed in the impeller shaft B. It can be seen clearly in the drawing how the liquid can flow from the grooves in the end cap R¹ through the tube S⁴ and the annular spaces around that tube and the tubes S⁵ S⁶ and thence by radial passages and annular grooves into the spaces Dˣ Eˣ Hˣ and Jˣ this flow being selectively determined by the multi-way cock as in the case of the construction shown in Figure 1.

What we claim as our invention and desire to secure by Letters Patent is:

1. In a variable speed transmission mechanism for the purpose indicated, the combination of a driving shaft on which are three gear wheels of different sizes, at least one impeller on a shaft, a set of two oppositely directed cone clutch members connected to the impeller, a second and similar set of two oppositely directed cone clutch members connected to a hollow shaft which carries also a cone clutch member adapted to engage one of the clutch members in the said impeller set, a second shaft which runs through the said first hollow shaft and carries at one end thereof a clutch member adapted to engage the second of the clutch members in the said impeller set and at the other end a pinion which meshes with one of the gear wheels on the said driving shaft, a third shaft rotatable on the said second shaft and carrying at one end thereof a clutch member adapted to engage one of the two clutch members in the said second set and on the other end a pinion which meshes with one of the gear wheels on the said driving shaft, a fourth shaft rotatable on the said third shaft and carrying at one end thereof a clutch member adapted to engage the other of the two clutch members in the said second set, and hydraulically actuated means for engaging the said clutch members and thereby coupling the impeller to the said first hollow shaft or to the said second hollow shaft, and also coupling the said third or the said fourth hollow shaft to the said first hollow shaft.

2. In a variable speed transmission mechanism for the purpose indicated, the combination of a driving shaft on which are three gear wheels of different sizes, at least one impeller on a shaft, a set of two oppositely directed cone clutch members connected to the impeller, a second and similar set of two oppositely directed cone clutch members connected to a hollow shaft which runs through the shaft of the impeller with the second set of two clutch members disposed on the side of the impeller remote from and opposite to the side at which lies the said first and impeller set of clutch members, a cone clutch member on this first hollow shaft adapted to engage one of the impeller clutch members, a second shaft which runs through the said first hollow shaft and carries at one end thereof a clutch member adapted to engage the second of the said impeller clutch members and at the other end a pinion which meshes with one of the gear wheels on the said driving shaft, a third shaft rotatable on the said second shaft and carrying at one end thereof a clutch member adapted to engage one of the two clutch members in the said second set and on the other end a pinion which meshes with one of the gear wheels on the said driving shaft, a fourth shaft rotatable on the said third shaft and carrying at one end thereof a clutch member adapted to engage the other of the two clutch members in the said second set, and hydraulically actuated means for engaging the said clutch members and thereby coupling the impeller to the said first hollow shaft or to the said second hollow shaft, and also coupling the said third or fourth shaft to the said first hollow shaft.

3. In a variable speed transmission mechanism for the purpose indicated, the combination of a driving shaft on which are three gear wheels of different sizes, at least one impeller on a shaft on which is a casing, two oppositely directed cone clutch members forming a set and carried by this impeller casing, a hollow shaft having on one end thereof a casing and at the other end a disc with a cone clutch member adapted to engage one of the clutch members in the said impeller casing, two oppositely directed cone clutch members forming a second set and carried by the casing on this hollow shaft, a second hollow shaft passing through the said first hollow shaft, a disc on the one end of this second shaft with a cone clutch member adapted to engage the second clutch member in the said impeller casing, a pinion on the other end of this second shaft which meshes with one of the gear wheels on the said driving shaft, a third hollow shaft which can rotate on the said second hollow shaft and has on one end thereof a disc with a cone clutch member adapted to engage one of the two clutch members in the casing on the said first hollow shaft, a pinion on the other end of this third shaft which meshes with the second of the gear wheels on the said driving shaft, a fourth hollow shaft which can rotate on the said third shaft and has on one end thereof a disc with a cone clutch member adapted to engage the second clutch member in the casing on the said first shaft, a pinion on the other end of this fourth shaft which meshes with the third gear wheel on the said driving shaft, and hydraulically actuated means by which the engagement and disengagement is caused of the respective clutch members carried by the said discs and the clutch members carried by the said impeller and shaft casings.

4. In a variable speed transmission mechanism for the purpose indicated, the combination of a driving shaft on which are three gear wheels of different sizes, at least one impeller on a shaft, a set of two oppositely directed cone clutch members connected to the impeller, a second and similar set of two oppositely directed cone clutch members connected to a hollow shaft which carries also a cone clutch member adapted to engage one of the clutch members in the said impeller set, a second shaft which runs through the said first hollow shaft and carries at one end thereof a clutch member adapted to engage the second of the clutch members in the said impeller set and at the other end a pinion which meshes with one of the gear wheels on the said driving shaft, a third shaft rotatable on the said second shaft and carrying at one end thereof a clutch member adapted to engage one of the two clutch members in the said second set and on the other end a pinion which meshes with one of the gear wheels on the said driving shaft, a fourth shaft rotatable on the said third shaft and carrying at one end thereof a clutch member adapted to engage the other of the two clutch members in the said second set, means by which the two clutch members in the said impeller set and the separate clutch members adapted to engage them can be moved relatively, means by which the two clutch members in the said second set and the separate clutch members adapted to engage them can be moved relatively, and hydraulic means whereby is caused the respective relative movements of these clutch members.

5. In a variable speed transmission mechanism for the purpose indicated, the combination of a driving shaft on which are three gear wheels of different sizes, at least one impeller on a shaft on which is a casing, two oppositely directed cone clutch members forming a set and carried by this impeller casing, a hollow shaft having on one end thereof a casing and at the other end a disc with a cone clutch member adapted to engage one of the clutch members in the said impeller casing, two oppositely directed cone clutch members forming a second set and carried by the casing on this hollow shaft, a second hollow shaft passing through the said first hollow shaft, a disc on the one end of this second shaft with a cone clutch member adapted to engage the second clutch member in the said impeller casing, a pinion on the other end of this second shaft which meshes with one of the gear wheels on the said driving shaft, a third hollow shaft which can rotate on the said second hollow shaft and has on one end theerof a disc with a cone clutch member adapted to engage one of the two clutch members in the casing on the said first hollow shaft, a pinion on the other end of this third shaft which meshes wtih the second of the gear wheels on the said driving shaft, a fourth hollow shaft which can rotate on the said third shaft and has on one end thereof a disc with a cone clutch member adapted to engage the second clutch member in the casing on the said first shaft, a pinion on the other end of this fourth shaft which meshes with the third gear wheel on the said driving shaft, means by which the set of clutch members in the said impeller casing and the separate clutch members adapted to engage them can be moved relatively, means by which the second set of clutch members in the casing on the said first hollow shaft and the separate clutch members adapted to engage them can be moved relatively, and hydraulic means whereby is caused the respective relative movements of these clutch members.

6. In a variable speed transmission mechanism for the purpose indicated, the combination of a driving shaft on which are three gear wheels of different sizes, at least one impeller on a rotatable shaft on which is a casing, an annulus within and so connected to this casing that it will rotate with the casing but can slide relatively to it in the direction of its axis, two oppositely directed cone clutch members forming a set and mounted on the annulus on opposite sides of an inwardly directed partition carried by the annulus, a hollow shaft having on one end thereof a casing and at the other end a disc with a cone clutch member adapted to engage a clutch member at one side of the partition in the annulus in the said impeller casing, an annulus within and so connected to the casing on the one end of the said first hollow shaft that it can slide relatively to the casing in the direction of its axis but must rotate therewith, two oppositely directed cone clutch members forming a second set and mounted on this annulus on opposite sides on an inwardly directed partition carried by the annulus, a second hollow shaft passing through the said first hollow shaft, a disc on the one end of this second shaft with a cone clutch member adapted to engage the clutch member on the other side of the partition in the annulus in the said impeller casing, a pinion on the other end of this second shaft which meshes with one of the gear wheels on the said driving shaft, a third hollow shaft which can rotate on the said second hollow shaft and has on one end thereof a disc with a cone clutch member adapted to engage a clutch member at one side of the partition in the annulus in the casing on the said first hollow shaft, a pinion on the other end of this third shaft member which meshes with the second of the gear wheels on the said driving shaft, a fourth hollow shaft which can rotate on the said third shaft and has on one end thereof a disc with a cone clutch member adapted to engage the clutch member on the other side of the partition in the annulus in the casing on the said first hollow shaft, a pinion on the other end of this fourth shaft which meshes with the third gear wheel on the said driving shaft, and hydraulic means for causing each of the said annulus to slide and thereby effect the engagement and disengagement of the several cltuch members.

7. In a variable speed transmission mechanism for the purpose indicated, the combination of a driving shaft on which are three gear wheels of different sizes, at least one impeller on a shaft, a set of two oppositely directed cone clutch members connected to the impeller, a second and similar set of two oppositely directed cone clutch members connected to a hollow shaft which carries also a cone clutch member adapted to engage one of the clutch members in the said impeller set, a second shaft which runs through the said first hollow shaft and carries at one end thereof a clutch member adapted to engage the second of the clutch members in the said impeller set and at the other end a pinion which meshes with one of the gear wheels on the said driving shaft, a third shaft rotatable on the said second shaft and carrying at one end thereof a clutch member adapted to engage one of the two clutch members in the said second set and on the other end a pinion which meshes with one of the gear wheels on the said driving shaft, a fourth shaft rotatable on the said third shaft and carrying at one end thereof a clutch member adapted to engage the other of the two clutch members in the said second set, hydraulically actuated means for effecting the engagement and disengagement of the said clutch members and thereby coupling the impeller to the said first hollow shaft or to the said second hollow shaft, and also coupling the said third or the said fourth hollow shaft to the said first hollow shaft, and a cock for selectively controlling this hydraulic actuation.

FRANK BERNARD HALFORD.
BENJAMIN WILLIAM BARLOW.